3,324,113
CERTAIN OXY DERIVATIVES OF
IMINODIBENZYL
Walter Schindler, Riehen, near Basel, and Henri Dietrich, Birsfelden, near Basel, Switzerland, assignors to Geigy Chemical Corporation, Ardsley, N.Y., a corporation of Delaware
No Drawing. Application Mar. 20, 1963, Ser. No. 266,505, which is a division of application Ser. No. 32,151, May 27, 1960. Divided and this application June 25, 1963, Ser. No. 290,309
26 Claims. (Cl. 260—239)

This application is a division of application Ser. No. 266,505, filed Mar. 20, 1963, and now abandoned, which, in turn is a division of application Ser. No. 32,151, filed May 27, 1960, and now abandoned.

The present invention concerns new derivatives of iminodibenzyl which have valuable pharmacological properties, as well as the intermediate products pertaining thereto.

The compounds according to the present invention correspond to the general formula

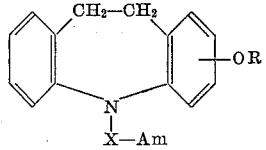

(I)

wherein
R represents a member selected from the group consisting of hydrogen, a lower alkyl radical and an aralkyl radical,
X represents a straight chain or branched chain alkylene radical with 2–6 carbon atoms,
Am represents a member selected from the group consisting of a lower alkylamino radical, a di(lower)alkylamino radical, a polymethyleneimino radical with 5–7 ring members, the morpholino radical, a 4-lower alkyl-piperazinyl-(1) radical, a 4-lower hydroxyalkyl-piperazinyl-(1) radical and a 4-(lower alkanoyloxy-lower alkyl)-piperazinyl-(1) radical, and
Am—X taken together represent a member selected from the group consisting of 1-lower alkyl-pyrrolidyl-lower alkyl radicals and 1-lower alkyl-piperidyl-lower alkyl radicals.

Of these compounds, those are especially valuable with regard to the pharmacological properties specified below wherein R is represented by hydrogen or the methyl radical, X is represented by an alkylene radical with 2–4 carbon atoms, Am is represented by a di(lower) alkylamino radical, a lower alkylamino radical, the piperidino radical, the pyrrolidyl-(1) radical, the 4-methyl-piperazinyl(1) radical or the 4-(β-hydroxyethyl)-piperazinyl-(1) radical. Of the compounds containing di(lower)alkylamino radicals or lower alkylamino radicals Am, those with the dimethylamino radical or the methylamino radical are of particular value. The substituent OR is preferably in the 2-, 3- or 4-position. Compounds with a benzyl radical R are especially valuable as intermediates for compounds with a hydrogen atom R, but these also have pharmacological properties of almost the same order as the other compounds mentioned above.

The compounds of the General Formula I are produced in the following manner: a compound of the general formula:

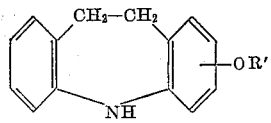

(II)

wherein

R′ represents a lower alkyl radical, an aralkyl radical, an α-alkoxyalkyl radical or the tetrahydropyranyl radical, with a reactive ester of an alcohol of the general formula $$HO—X—Am'$$ (III)

wherein
Am′ represents a radical corresponding to the definition for Am with the exception of a monoalkylamino group, or a lower N-arylmethyl-alkylamino group or N-acyl-alkylamino group and
X has the meaning given above, the reaction being performed in the presence of an alkaline condensing agent. If necessary, the condensation product of the general Formula IV which already embraces some of the compounds of the general Formula I

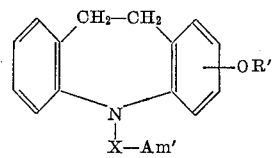

(IV)

is then converted, depending on the meaning of R′ and Am′, into a compound of the general Formula I defined above, advantageously by acid hydrolysis or by transacetalisation or hydrogenolysis, in which compound R is hydrogen and/or Am is a lower alkylamino group.

In particular sodium amide, lithium amide, potassium amide, sodium, potassium, butyl lithium, phenyl lithium, sodium hydride or lithium hydride are suitable alkaline condensing agents for the reaction of compounds of the general Formula II with reactive esters of basic alcohols of the general Formula III. The reaction can be performed in the presence or absence of an inert organic solvent, as which can be named as examples, benzene, toluene and xylene.

The hydrogenolysis which may be desirable to replace an aralkyl radical R′ by hydrogen can be performed, for example, in an organic or, advantageously in acid, aqueous-organic solution, e.g. in methanoilc hydrochloric acid in the presence of a nickel or noble metal catalyst. Thus the hydrogenolysis is performed, for example in the presence of palladium charcoal at room temperature and normal pressure until about the molar amount of hydrogen has been taken up. Generally, somewhat more energetic reaction conditions are necessary to simultaneously split off an aralkyl radical in the group Am′, e.g. hydrogenation in the presence of Raney nickel at temperatures of up to about 80° C. and pressures up to about 50 atmospheres. In this case the hydrogenation is broken off only after about double the molar amount of hydrogen has been taken up.

Compounds of the general Formula I are obtained by a further process by reacting a reactive ester, e.g. a halide, of a compound of the general formula

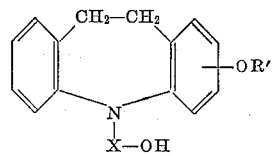

(V)

wherein R′ and X have the meanings given above, with a compound of the general formula $$Am—H$$ (VI)

or $$Am'—H$$ (VII)

wherein Am and Am′ have the meanings given above. The reaction is performed in the presence of an acid binding agent, advantageously in an excess of the amine of the general Formula VI or VII to be reacted or, in in reacting an N-acylalkylamine of the general Formula VII it is performed in the presence of an alkali metal amide or hydride. If necessary, a condensation product corresponding to the general Formula IV given above is then converted into a compound of the general Formula I by measures suitable depending on the meaning of R' and Am'.

In contrast to the first process described, this process enables compounds in which Am is a lower alkylamino group to be produced direct.

A third process consists in treating a compound of the general formula

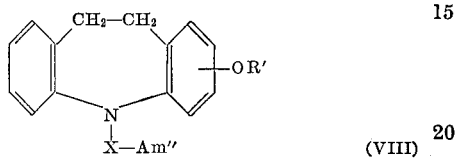

(VIII)

wherein

Am" represents the amino group or a lower alkylamino group and X and R' have the meanings given above, with a lower alkylating agent and, if necessary, converting the reaction product into a compound of the general Formula I by measures given under the general Formula IV depending on the meaning of R'.

Compounds of the general Formula I are also obtained by reducing compounds of the general formula

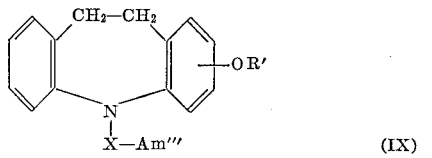

(IX)

wherein X' and Am'' have the meanings given above for X and Am but in at least one of them there is a carbonyl group bound to a nitrogen atom instead of a methylene group, and R' has the meaning given in general Formula II, with an alkali metal-earth metal hydride, in particular with lithium aluminum hydride and then, if necessary, converting the reduction product into a compound of the general Formula I by the measures given under general Formula IV depending on the meaning of R'.

Finally, compounds of the general Formula I wherein the substituent —OR represents a hydroxyl group in the 2-position, are obtained by oxidising, in a neutral to weakly acid aqueous solution, a compound of the general formula

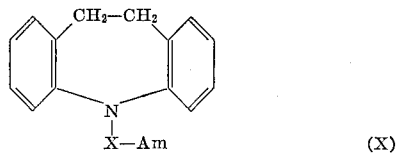

(X)

wherein X and Am have the meanings given above, with oxygen or hydrogen peroxide, the oxidation being performed in the presence of a compound of the atomic grouping —CO—C(OH)=C(OH)— or

—CO—CO—CO— such as, e.g. ascorbic or dehydroascorbic acid, in the presence of ions of a heavy metal from the group iron, nickel, cobalt and manganese and, possibly, of a complex former, e.g. ethylenediamine tetraacetic acid, citric acid or o-phenanthroline.

In the compounds of the general Formula I, R is, for example, hydrogen, the methyl, ethyl, n-propyl, isopropyl, n-butyl, benzyl or benzhydryl radical; X is, for example the ethylene, 1.2-propylene, 1.3-propylene, 2-methyl-1.3- propylene, 2.3-butylene, 1.3-butylene, 1.4-butylene, 2.2-dimethyl-1.3-propylene, 1.5-pentylene or 1.6-hexylene radical; and Am is, for example the methylamino, ethylamino, n-propylamino, isopropylamino, n-butylamino, isobutylamino, dimethylamino, methylethylamino, diethylamino, di-n-propylamino, methylisopropylamino, di-n-butylamino, di-isobutylamino, pyrrolidyl-(1), piperidino, hexamethyleneimino, morpholino, 4-methyl-piperazinyl-(1), 4-acetoxyethyl-piperazinyl-(1) or 4-hydroxyethyl-piperazinyl-(1) radical; and X-Am together are, for example, the 1-methyl-piperidyl-(3)-methyl, 1-methyl-piperidyl-(2)-ethyl, or 1-methyl-pyrrolidyl-(2)-ethyl radical.

The starting materials of the general Formula II are produced for example in the following manner:

An amino compound of the general formula

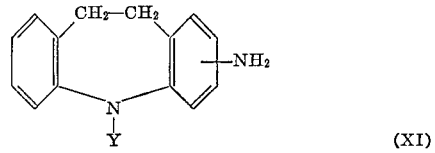

(XI)

wherein

Y is an acyl radical which can easily be split off, in particular the acetyl radical, is converted into a corresponding diazonium salt of a non-reducing oxygen acid such as, e.g. sulphuric acid, and the latter is decomposed by heating with water or with excess aqueous acid. The hydroxyl compound obtained of the general formula

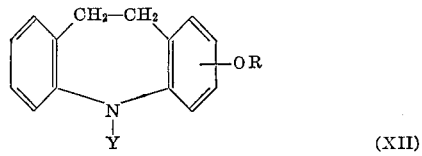

(XII)

is reacted with a low molecular alkylating agent or with an aralkyl halide or α-halogen dialkyl ether, in the presence of an acid binding agent, or with dihydropyrane or with a vinyl alkyl ether and then hydrolysed, advantageously alkaline, in order to split off the radical Y. However, this radical can also be split off before the etherification or acetalisation of the hydroxyl group.

It is possible to produce the starting materials of the general Formula XII mentioned above for example, by using corresponding compounds in the Schmidt reaction which, instead of the amnio group, have an acetyl radical and then partially hydrolysing the acetamino compounds formed while retaining the 5-acyl radical Y, which is advantageously the acetyl radical, for example by boiling with 2 N-hydrochloric acid until the product is completely dissolved in the acid.

The 2-hydroxy-iminodibenzyl, which is a hydrolysis product of compounds of the general Formula XII, can also be obtained from iminodibenzyl (10.11-dihydro-5H-dibenzo[b.f]azepine) by oxidising with a solution of potassium-nitroso-disulphonate (Fremy's salt) to form 2-oxo-10.11-dihydro-2H-dibenzo[b.f]azepine and reducing the latter by catalytic or chemical means.

In addition, 4-hydroxy-5-benzoyl-iminodibenzyl and 4-hydroxy-5-acetyl-iminodibenzyl which are embraced by the general Formula XII can also be obtained by treating iminodibenzyl with the equimolar amount of benzylperoxide or acetylperoxide, for example in the cold in chloroform solution.

The radical R' can be introduced into compounds of the general Formula XII or into their hydrolysis products obtained for example by boiling with alcoholic potassium lye, for example by reacting with a reactive ester of a lower alkanol such as dimethyl sulphate, diethyl sulphate, methyl iodide, p-toluene sulphonic acid methyl ester, 2.4-dinitrobenzene sulphonic acid methyl ester, ethyl bromide, ethyl iodide, n-propyl bromide, n-butyl bromide or isobutyl bromide, the reaction being performed in the presence of potassium hydroxide, or by reacting with diazomethane as low alkylating agent. Also benzyl halides or benzhydryl halides can be used instead of the aliphatic halides given. If the hydrolysis is performed after etherification, it is possible that the isolation of the ether before the hydrolysis is not only unnecessary but, because partial hydrolysis may have already occurred on etherification, it is even disadvantageous. If, instead of actual ethers, compounds of an acetal character are produced, for example by reacting compounds of the general Formula XII with dihydropyrane or with chlorodimethyl ether, then naturally, in the following hydrolysis the use of alkaline agents such as alcoholic potassium hydroxide already mentioned, is particularly advisable.

Examples of starting materials of the general Formula II are 2-benzyloxy-iminodibenzyl (2-benzyloxy-10.11-dihydro-5H-dibenzo[b.f]azepine), 2-benzhydryloxy-iminodibenzyl, 2-methoxy-iminodibenzyl, 2-[tetrahydropyranyl-(2')-oxyl]iminodibenzyl, 3-benzyloxy-iminodibenzyl, 3-methoxy-iminodibenzyl, 3-ethoxy-iminodibenzyl, 3-[tetrahydropyranyl-(2')-oxy]-iminodibenzyl, 3 - methoxymethoxy-iminodibenzyl and 3-($\alpha$-ethoxyethoxy)-iminodibenzyl, 4-benzyloxy-iminodibenzyl and 4-methoxy-iminodibenzyl.

The halides are utilised particularly as reactive esters of alcohols of the general Formula III; individually can be named:

$\beta$ - dimethylaminoethyl chloride, $\beta$ - diethylaminoethyl chloride, $\beta$-methylethylaminoethyl chloride, $\beta$-dimethylaminopropyl chloride, $\beta$-dimethylaminoisopropyl chloride, $\gamma$ - dimethylaminopropyl chloride, $\gamma$ - dimethylamino-$\beta$-methylpropyl chloride, $\delta$-dimethylaminobutyl chloride, $\beta$-(di-n-propylamino)-ethyl chloride, $\beta$-(N-methylisopropylamino)-ethyl chloride, $\beta$-(di-n-butylamino)-ethyl chloride, $\beta$-(di-isobutylamino)-ethyl chloride, $\beta$-pyrrolidyl-(1)-ethyl chloride, $\beta$-piperidino-ethyl chloride, $\gamma$-pyrrolidyl-(1)-propyl chloride, $\gamma$-piperidino-propyl chloride, $\gamma$-hexamethylenimino-propyl chloride, $\beta$-morpholino-ethyl chloride, $\beta$-(4-methylpiperazinyl-(1)-propyl chloride, $\beta$-[4-acetoxyethyl-piperazinyl-(1)]-ethyl chloride, $\gamma$-[4-acetoxyethyl-piperazinyl-(1)]-propylchloride, 1-methyl-piperidyl-(3) - methyl chloride, 1-methyl-piperidyl-(2)-ethyl chloride, $\beta$-[1-methyl-pyrrolidyl-(2)]-ethyl chloride, $\beta$-(N-formylethylamino)-ethyl chloride, $\gamma$-(N-carbethoxymethylamino)-propyl chloride, $\gamma$-(N-methane sulphonylethylamine)-propyl chloride, and $\gamma$-(N-p-toluene sulphonylethylamine)-propyl chloride, and $\gamma$-(N-p-toluene sulphonylethylamino)-propyl chloride as well as the corresponding bromides and iodides.

Reactive esters of compounds of the general Formula V are obtained for example by reacting alkali metal compounds of iminodibenzyl substituted in a benzene ring by a methoxy-, ethoxy, benzyloxy, benzhydryloxy, tetrahydropyranyl-(2)-oxy or methoxymethoxy group, with advantageously mixed diesters of alkylene glycols such as, e.g. 1-chloro-2-bromoethane, 1-chloro-3-bromopropane, 1.2-dichloropropane, 1.2-dibromopropane, 1-chloro-4-bromo-n-butane, 1.4 dibromobutane, 1-bromo-2-methyl-3-chloropropane or $\omega$-halogen alkyl esters of p-toluene sulphonic acid, 2.4-dinitrobenzene sulphonic acid or of methane sulphonic acid. In addition, such reactive esters are obtained, for example, by reacting the alkali metal compounds mentioned above with alkylene oxides and treating the hydroxyalkyl compounds obtained with inorganic acid halides, aryl sulphonic acid chlorides or methane sulphochloride whereupon 5-halogen alkyl, 5-arylsulphonyloxyalkyl, or 5-methane sulphonyloxyalkyl derivatives of iminodibenzyl substituted in one benzene nucleus by one of the radicals named above are obtained.

Amines of the general Formula VI suitable for reaction with reactive esters of compounds of the general Formula V are, for example, methylamine, ethylamine, n-propylamine, isopropylamine, n-butylamine, dimethylamine, diethylamine, di-n-butylamine, pyrrolidine, piperidine, hexamethyleneimine, morpholine, N-methyl-piperazine, N-hydroxyethyl-piperazine and N-acetoxyethylpiperazine. In addition to the amines given above, also, for example, N-methylbenzylamine, N-ethylbenzylamine, N-methylformamide, N-ethyl formamide and N-methylmethane sulphonamide can be added as compounds of the general Formula VII.

Insofar as Am'' in the starting materials of the general Formula VIII is a lower alkylamino group, these compounds are identical with, in particular the compounds of the general Formula IV produced by the second process described above. Compounds of the general Formula VIII having the primary amino group as Am'' are obtained, for example, starting from halides of compounds of the general Formula V by the known methods for replacement of a halogen atom by the primary amino group.

Starting materials of the general Formula IX are, for example, the 5-(tert. aminocarbonylalkyl)-iminodibenzyls substituted in one benzene ring by a radical —OR'; they are obtained for example by reacting iminodibenzyl derivatives of the general Formula II given above with lower bromoalkane carboxylic acid dialkylamides, pyrrolidides, piperidides, morpholides or -4-alkyl piperazides. Further starting materials of the general Formula IX are, for example, the correspondingly substituted 5-(alkylaminoalkanoyl)-, 5-dialkylaminoalkonyl- and 5-piperidinoalkanoyl-iminodibenzyls which are produced, for example, by reacting alkali metal derivatives of compounds of the general Formula II with low halogen alkane carboxylic acid halides and then further reacting the substituted 5-halogen alkanoyl-iminodibenzyls obtained with lower alkylamines, dialkylamines or piperidine. Examples of starting materials of the general Formula IX having one or two carbonyl groups in the radical Am'' are the 5-(alkanoylaminoalkyl)-, 5-(N-alkylalkanoylaminoalkyl)-, 5-(N-alkylalkonylaminoalkyl)-, 5-(dialkanoylaminoalkyl)-, 5-(2'-oxo-piperidino-alkyl)-, 5-(2'-oxo - hexamethyleneiminoalkyl)-, 5-(succinimidoalkyl)- and 5-(glutarimidoalkyl)- iminodibenzyls substituted in one benzene ring by a radical OR'. These are produced, for example, by reacting reactive esters of compounds of the general Formula V with alkali metal compounds of low alkane carboxylic acid amides, alkane carboxylic acid-N-alkylamides, dialkane carboxylic acid imides, $\delta$-valerolactam, $\epsilon$-caprolactam, succinimide or glutarimide, or they can also be obtained possibly by acylating substituted 5-aminoalkyl- or 5-alkylaminoalkyl-iminodibenzyls of the general Formula VIII.

Starting materials of the general Formula X are obtained, for example, analogously to the first process above by reacting iminodibenzyl with a lower dialkylaminoalkyl halide, or analogously to the second process given above, by reaction of a lower 5-halogen alkyl-iminodibenzyl with an amine of the general Formula VI.

The compounds produced according to the invention have, in particular, antiallergic, sedative, serotonin-antagonistic, antipyretic and thymoleptic activity with only slight vegetative side effects. They are suitable, for example, for the treatment of certain forms of human mental disorders, particularly depressions. Some of them are also suitable as intermediate products for the production of other substances having similar properties. They are administered per os or in the form of aqueous solutions of their non-toxic salts, i.e. salts with pharmaceutically acceptable acids, also on parenteral routes.

The compounds of the general Formula I produced according to the invention form salts, some of which are water soluble, with inorganic or organic acids such as hydrochloric acid, hydrobromic acid, sulphuric acid, phosphoric acid, methane sulphonic acid, ethane disulphonic acid, acetic acid, succinic acid, fumaric acid, maleic acid, malic acid, tartaric acid, citric acid, benzoic acid and phthalic acid.

The following examples further illustrate the production according to the invention of compounds of the general Formula I but by no means limit the scope of the invention thereto. Where not otherwise stated, parts are given therein as parts by weight; their relationship to parts by volume is as that of grammes to cubic centimetres. The temperatures are in degrees centigrade.

*Example 1*

(a) 3 parts of iminodibenzyl are dissolved in 300 parts by volume of actone. 9 parts of potassium nitrosodisulphonate (Fremy's salt) and 75 parts by volume of $m_6$ disodium phosphate dissolved in 525 parts of water are then added in 10 portions within 15 minutes to this solution whereupon the colour of the solution changes from blue to red-brown. After all the salt solution has been added, the whole is filtered through a layer of Hyflo and the acetone is evaporated from the filtrate in the vacuum. The 2-oxo-10.11 dihydro-2H-dibenzo[b.f]azepine crystallises out from the remaining aqueous solution. The pure substance is obtained by chromatographing through a silica gel column and eluting with a mixture of 90% of benzene and 10% of ether. After crystallization from petroleum ether, it melts at 105–106°.

(b) 18.6 parts of 2-oxo-10.11-dihydro-2H-dibenzo[b.f]azepine are dissolved in 450 parts by volume of methanol and the solution is shaken, in the presence of 2 parts of Lindlar catalyst, in a hydrogen atmosphere at room temperature until the calculated amount of hydrogen (1790 parts by volume) have been taken up. The catalyst is filtered off and the methanol is concentrated in a vacuum in a nitrogen atmosphere. The solid residue is recrystallised from chloroform whereupon 2-hydroxy-iminodibenzyl (2 - hydroxy-10,11-dihydro-5H-dibenzo[b.f]azepine) is obtained, M.P. 168–169°.

(c) The 2-oxo-10.11-dihydro-2H-dibenzo[b.f]azepine obtained according to (a) above can also be reduced chemically. For example, 1.0 part of this substance is dissolved in 40 parts by volume of methanol and a solution of 1.6 parts of sodium hydrosulphite in 10 parts of water is added to the dark red solution whereupon it becomes decoloured. The solution is poured into a lot of water and is extracted with ether. The ethereal solution is washed with water, dried and concentrated. The residue is recrystallised from a little chloroform, whereupon the 2-hydroxy-iminodibenzyl is obtained.

(d) 18.6 parts of 2-hydroxy-iminodibenzyl are dissolved in a solution of 6 parts of potassium hydroxide in 180 parts by volume of anhydrous alcohol, 11.5 parts of benzyl chloride are added and the whole is refluxed for 18 hours. The alcohol is then distilled off and the residue is taken up in ether. The ethereal solution is washed first with dilute caustic soda lye and then with water, dried and concentrated. The residue is recrystallised from ether/pentane. The 2-benzyloxy-iminodibenzyl so obtained melts at 92–94°

(e) The base liberated from 9 parts of γ-dimethylamino-propyl chloride hydrochloride and 14.3 parts of 2-benzyloxy-iminodibenzyl is dissolved in 200 parts by volume of benzene and a suspension of 2.5 parts of sodium amide in toluene is added at 50°. The reaction mixture is then refluxed for 18 hours, then cooled and water is added. The benzene phase is extracted four times with 2.5 parts by volume of 1 N-hydrochloric acid each time and the acid extracts are made alkaline with concentrated caustic soda lye. The precipitated base is taken up in ether, the ether solution is thoroughly washed with water, dried and concentrated. The residue is distilled in a high vacuum. The 2-benzyloxy-5-(γ-dimethylaminopropyl)-iminodibenzyl passes over at 212–215° under 0.002 mm. pressure.

2 - benzyloxy-5-(β-diethylaminopropyl)-iminodibenzyl is obtained in an analogous manner on using the base liberated from 11 parts of β-diethylaminopropyl chloride-hydrochloride.

(f) 1.23 parts of the above compound are dissolved in 30 parts by volume of methanol and 5 parts by volume of 1 N-hydrochloric acid and the solution is shaken at room temperature and in the presence of 0.36 part of palladium charcoal until the theoretical amount of hydrogen has been taken up. The catalyst is then filtered off under suction and the filtrate is concentrated in the vacuum. The residue which remains is made alkaline with concentrated ammonia whereupon the 2-hydroxy-5-(γ-dimethylaminopropyl)-iminodibenzyl precipitates in crystalline form. It can be recrystallised from acetone/ether. M.P. 132–133°.

*Example 2*

(a) 25.2 parts of 3-amino-5-acetyl-iminodibenzyl are dissolved in 150 parts by volume of water and 30 parts by volume of concentrated sulphuric acid and the solution is diazotised at 0° with 7 parts of sodium nitrite in 20 parts by volume of water. After being left to stand for 15 minutes, the solution is heated to 80°. On completion of the nitrogen development, the solution is cooled and the resinous reaction product is separated. It is dissolved in hot ether, to remove the insoluble reddish by product the ether solution is filtered and the filtrate is evaporated to dryness. On adding a little benzene, the residue dissolves and then immediately crystallises out. On recrystallising from benzene, a product containing crystal benzene is obtained (about ⅔ mol benzene) which has a clear melting point of 104–104.5°. By heating for a short time above the melting point, the benzene-free 3-hydroxy-5-acetyliminodibenzyl is obtained which melts at 78–82°.

(b) 25.3 parts of 3-hydroxy-5-aectyl-iminodibenzyl are dissolved in ether and 5 parts of diazomethane in ether are added to this solution whereupon nitrogen is developed immediately. After leaving to stand for some time at room temperature, the excess diazomethane is decomposed by adding a few drops of acetic acid. Non-reacted 3-hydroxy-5-acetyl-iminodibenzyl is removed from the ether solution by shaking with dilute caustic soda lye. After washing and drying the ether solution, it is evaporated to dryness. The greenish oily residue is boiled for 4 hours in 250 parts by volume of alcohol containing 10 parts of potassium hydroxide. On cooling, the reaction product crystallises out. After diluting with water, the crystals are drawn off under suction, thoroughly washed with water and dried. On recrystallising from hexane, 3-methoxy-imidodibenzyl is obtained in the form of yellowish crystals which melt at 94°.

(c) 22.5 parts of 3-methoxy-iminodibenzyl are dissolved in 250 parts by volume of anhydrous xylene and the solution is heated for 3 hours while stirring at 90–100° with 4.3 parts of sodium amide pulverized in toluene. Then, γ-dimethylaminopropyl chloride (liberated from 16 parts of the hydrochloride and taken up in xylene) is added and the whole is refluxed for 20 hours. The base is extracted from the reaction mixture with 2 N-hydrochloric acid and then liberated with 5 N-caustic soda lye. The free base is taken up in ether. After drying with sodium sulphate and evaporating off the ether, an oil remains which on distilling in a high vacuum passes over at 140–142° under 0.001 mm. pressure. If the purified base is added to 2 N-hydrochloric acid then, after standing for several hours, the hydrochloride of 3-methoxy-5-(γ-dimethylaminopropyl)-iminodibenzyl crystallises out; M.P. 177°.

In an analogous manner, on using the base liberated from 20 parts of β-[1-methyl-piperidyl-(2)]-ethyl chloride - hydrochloride, 3-methoxy-5-[1′-methyl-piperidyl-(2′)-ethyl]-iminodibenzyl is obtained, and on using the base liberated from 18 parts of β-pyrrolidyl-(1)-ethyl chloride-hydrochloride, 3-methoxy-5-[β-pyrrolidyl-(1′)-ethyl]-iminodibenzyl is obtained.

*Example 3*

25.3 parts of 3-hydroxy-5-acetyl-iminodibenzyl are dissolved in a sodium ethoxide solution prepared from 2.3 parts of sodium and 200 parts by volume of anhydrous alcohol. 12.7 parts of benzyl chloride are added to the red solution whereupon sodium chloride immediately begins to precipitate. After refluxing for 15 hours, the sodium chloride is filtered off and the solution is concentrated in vacuo. The residue is taken up in ether and any unreacted hydroxy compound is extracted with 2 N-caustic soda lye. The ether solution is then washed with water, dried with sodium sulphate and evaporated to dryness. The remaining crystalline 3-benzyloxy-5-acetyl-iminodibenzyl can be recrystallised from a little alcohol and it melts at 91°.

(b) 34.3 parts of 3-benzyloxy-5-acetyl-iminodibenzyl are hydrolysed by boiling for 10 hours with alcoholic potassium lye (12 parts of KOH in 250 parts by volume of alcohol). The solution is then concentrated in vacuo. Water is added to the oily residue and the 3-benzyloxy-iminodibenzyl is extracted with ether. The dried ether solution is avaporated to dryness. The oil obtained crystallises after standing for 24 hours. On recrystallising from benzene/petroleum ether, the 3-benzyloxy-iminodibenzyl melts at 111°.

(c) 4.3 parts of crude 3-benzyloxy-iminodibenzyl are dissolved in 60 parts by volume of anhydrous toluene and to the refluxing solution there is added dropwise 1.6 parts by volume of a 33% suspension of sodamide in anhydrous toluene. After 2 hours, a freshly prepared solution of 2 parts of $\beta$-piperidino-ethyl chloride in 40 parts by volume of anhydrous toluene is added and then another 0.8 part by volume of the sodamide suspension are added. After 14 hours of reflux the charge is cooled, water is added and the phases are separated. The organic layer is extracted three times with 2 N-hydrochloric acid, the combined aqueous hydrochloric extracts are basified with concentrated ammonia and the resulting suspension is extracted with ether. The ether extract is dried over sodium sulphate and evaporated, yielding crude 3-benzyloxy-5-($\beta$-piperidino-ethyl)-iminodibenzyl. This is converted to the hydrochloride by means of ethanolic hydrogen chloride; the hydrochloride is crystallised from methanol-acetone, M.P. 208–209° after transition to fine needles above 185°.

In an analogous manner, 3-benzyloxy-5-($\gamma$-dimethylaminopropyl)-iminodibenzyl, B.P.$_{0.025}$ 202°, is prepared from 3-benzyloxy-iminodibenzyl and $\gamma$-dimethylaminopropyl chloride, and 3-benzyloxy-5-[$\gamma$-(4'-methyl-piperazinyl-1')-$\beta$-methylpropyl]-iminodibenzyl, B.P.$_{0.008}$ 260°, is obtained from 3-benzyloxy-iminodibenzyl and $\gamma$-(4-methyl piperazinyl-1)-$\beta$-methylpropyl chloride. The oxalate melts at 207–209° on decomposition.

(d) By hydrogenolysing analogously to Example 1 (f) from the above 5-substituted 3-benzyloxy-iminodibenzyls, the corresponding 5-substituted 3-hydroxy-iminodibenzyls, namely 3 - hydroxy - 5 - ($\beta$ - piperidino - ethyl) - iminodibenzyl, 3 - hydroxy - 5 - ($\gamma$ - dimethylaminopropyl)-iminodibenzyl and 3 - hydroxy - 5 - [$\gamma$ - (4' - methyl-piperazinyl - 1') - $\beta$ - methylpropyl] - iminodibenzyl are obtained.

(e) Starting from 4 - hydroxy - 5 - benzoyl - iminodibenzyl (obtained by oxidizing iminodibenzyl with benzoyl peroxide in chloroform solution at 10°; M.P. 171°), 4-benzyloxy-iminodibenzyl is obtained analogously to the above paragraphs (a) and (b), and from that compounds 4 - benzyloxy - 5 - ($\gamma$ - dimethylaminopropyl)-iminodibenzyl is obtained analogously to paragraph (c) above and 4 - hydroxy - 5 - ($\gamma$ - dimethylaminopropyl)-iminodibenzyl is obtained analogously to Example 1 paragraph (f).

*Example 4*

(a) 7.5 parts of 2-benzyloxy-iminodibenzyl and 5.5 parts of 1-chloro-3-bromopropane are dissolved in 150 parts by volume of anhydrous benzene and, at 58–60°, a suspension of 1.5 parts of sodium amide in toluene is added in portions. The reaction mixture is then stirred for 16 hours at this temperature. After cooling, water is added, the benezene solution is separated, thoroughly washed with water, dried and evaporated, whereupon the 5 - ($\gamma$ - chloropropyl) - 2 - benzyloxy - iminodibenzyl remains as a viscous oil.

(b) 8.5 parts of the above chloropropyl compound are dissolved in 25 parts by volume of anhydrous benzene and the solution is heated in the autoclave for 12 hours at 80–90° with 40 parts by volume of methanol which has been saturated with methyl amine at 5°. After cooling, the solvent is evaporated off, water is added to the residue whereupon it is exhaustively extracted with ether. The basic portions are removed from the ethereal solution by shaking three times with diluted acetic acid.

The combined acetic acid extracts are made alkaline and extracted with ether. The ethereal solution is washed, dried and evaporated. The oily residue is distilled in a high vacuum whereupon the 2-benzyloxy-5-($\gamma$-methylaminopropyl)-iminodibenzyl passes over at 225° under 0.02 mm. pressure.

In an analogous manner, on using 50 parts by volume of saturated methanolic ethylamine solution, 2-benzyloxy-5-($\gamma$-ethylaminopropyl)-iminodibenzyl is obtained and on using the methanolic solution of 7 parts of N-($\beta$-hydroxyethyl)-piperazine and adding 2 parts of sodium iodide, 2-benzyloxy - 5 - [$\gamma$ - (4' - hydroxyethyl - piperazinyl - 1')-propyl] - iminodibenzyl is obtained.

(c) 3.4 parts of the above distillate are dissolved in 9.2 parts by volume of 1 N-hydrochloric acid and the volume is made up to 100 parts by volume with methanol. This solution is hydrogenated at room temperature and normal pressure in the presence of 1 part of 5% palladium charcoal until the calculated amount of hydrogen has been taken up. The catalyst is filtered off, the filtrate is concentrated and dilute ammonia solution is added to the residue until the reaction is alkaline. The crystals which precipitate are filtered off under suction and recrystallised from acetone. The 2-hydroxy-5-($\gamma$-methylaminopropyl)-iminodibenzyl so obtained melts at 160°.

In an analogous manner, 2-hydroxy-5-($\gamma$-ethylaminopropyl) - iminodibenzyl and 2 - hydroxy - 5 - [$\gamma$ - (4' - hydroxyethyl - piperazinyl - 1') - propyl] - iminodibenzyl are obtained from the corresponding benzyloxy compounds.

*Example 5*

10.5 parts of ferrous sulphate, 76.2 parts of the disodium salt of ethylenediamine tetra-acetic acid, 75 parts of ascorbic acid and, finally while stirring strongly, 75 parts of 5 - ($\gamma$ - dimethylaminopropyl) - iminodibenzyl are dissolved in 7500 parts by volume of $m_{15}$ phosphate buffer solution according to Soerensen, pH 6.8. Oxygen is introduced for 7 hours at 37° through a glass frit whereupon the solution slowly becomes more darkly coloured. The solution is then cooled, the pH is adjusted to 10 with concentrated ammonia and the solution, which is now dark blue coloured, is extracted three times with ethyl acetate. The united extracts are washed at least six times with water in order to remove any dissolved iron salts. Then the clear ethyl acetate solution is extracted three times with 50 parts by volume of 2 N-hydrochloric acid, the clear acid extracts are made alkaline with concentrated ammonia and the basic substances which are precipitated are again taken up in ethyl acetate. The ethyl acetate solution is dried over sodium sulphate and the solvent is removed by evaporation in the vacuum whereupon an almost black oil remains. This is dissolved in 420 parts by volume of 70% methanol and the solution is extracted four times with 420 parts by volume of pentane each time whereupon a black resin is deposited on the sides of the separating funnel which resin can be disregarded. The methanolic solution is then concentrated in vacuo, the residue is taken up in ethyl acetate, the solution is washed with water, dried over sodium sulphate and concentrated in vacuo. The residue is chromatographed through a column prepared from 450 parts of silicagel and ether. On eluting with mixtures of equal parts of ether and acetone, fractions of the crude product are eluted which melt betwen 120° and 126° These are combined and first crystallised from a very little acetone and then from a great quantity of ether whereupon the 2 - hydroxy - 5 - (γ - dimethylaminopropyl) - iminodibenzyl is obtained which melts at 134–135°. More pure substance can be obtained from the following ether/acetone eluates and acetone eluates by repeated analgous recrystallisation. This further pure substance melts between 100 and 114°.

What we claim is:

1. A compound of the formula

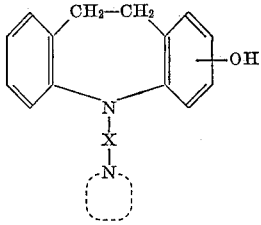

wherein

represents polymethyleneimino with 5 to 7 ring members, and X is alkylene with 2 to 6 carbon atoms.

2. A salt, with a non-toxic pharmaceutically acceptable acid, of a compound of the formula

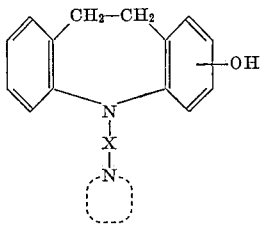

wherein

represents polymethyleneimino with 5 to 7 ring members, and X is alkylene with 2 to 6 carbon atoms.

3. A compound of the formula

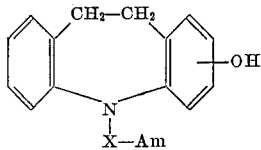

wherein Am is morpholino, and X is alkylene with 2 to 6 carbon atoms.

4. A salt, with a non-toxic pharmaceutically acceptable acid, of a compound of the formula

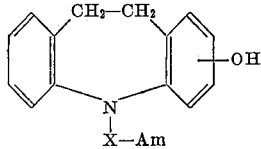

wherein Am is morpholino, and X is alkylene with 2 to 6 carbon atoms.

5. A compound of the formula

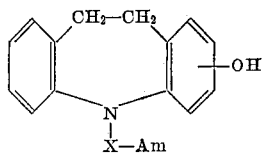

wherein Am—X— represents 1-(lower alkyl)-pyrrolidyl-(lower alkyl).

6. A salt, with a non-toxic pharmaceutically acceptable acid, of a compound of the formula

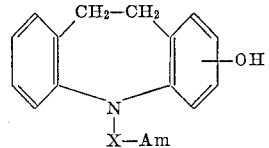

wherein Am—X— represents 1-lower alkyl-pyrrolidyl-lower alkyl.

7. A compound of the formula

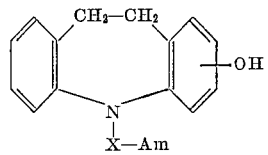

wherein Am—X— represents 1-(lower alkyl)-piperidyl-(lower alkyl).

8. A salt, with a non-toxic pharmaceutically acceptable acid, of a compound of the formula

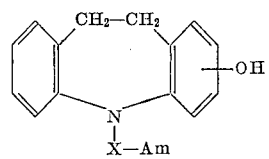

wherein Am—X— represents 1-(lower alkyl)-piperidyl-(lower alkyl).

9. A compound selected from the group consisting of a derivative of iminodibenzyl of the formula

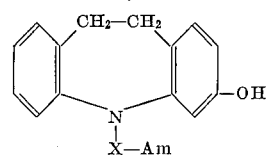

wherein X represents an alkylene radical with 2 to 4 carbon atoms, and Am represents a lower alkylamino radical, and non-toxic pharmaceutically acceptable acid addition salt thereof.

10. A compound selected from the group consisting of a derivative of iminodibenzyl of the formula

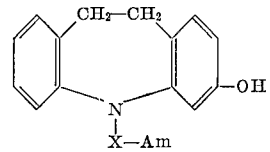

wherein X represents an alkylene radical with 2 to 4 carbon atoms, and Am represents a di-lower alkylamino radical, and non-toxic pharmaceutically acceptable acid solution salt thereof.

11. The compound 2 - benzyloxy - 5-(γ-dimethylaminopropyl)-iminodibenzyl.

12. The compound 3-benzyloxy-5-(γ-dimethylaminopropyl)-iminodibenzyl.

13. The compound 2-benzyloxy-5-(γ-methylaminopropyl)-iminodibenzyl.

14. 3-hydroxy-5 - (γ - dimethylaminopropyl) - iminodibenzyl.

15. 4-hydroxy-5 - (γ - dimethylaminopropyl) - iminodibenzyl.

16. A member selected from the group consisting of 2-benzyloxy - iminodibenzyl, 3 - benzyloxy-iminodibenzyl and 4-benzyloxy-iminodibenzyl.

17. The compound 2-benzyloxy-iminodibenzyl.

18. The compound 3-benzyloxy-iminodibenzyl.

19. 4-benzyloxy-iminodibenzyl.

20. A compound selected from the group consisting of a derivative of iminodibenzyl of the formula

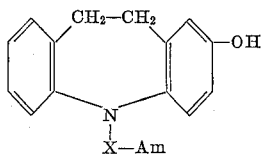

wherein X represents alkylene with 2 to 6 carbon atoms, and

Am represents lower alkylamino, and the salt thereof with a non-toxic acid.

21. A compound selected from the group consisting of a derivative of iminodibenzyl of the formula

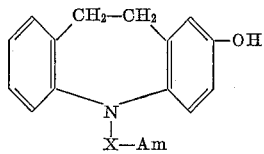

wherein X represents alkylene with 2 to 6 carbon atoms, and

Am represents di(lower)alkylamino, and the salt thereof with a non-toxic acid.

22. 2-hydroxy-5-($\gamma$ - dimethylaminopropyl) - iminodibenzyl.

23. 2 - hydroxy-5 - ($\gamma$ - methylaminopropyl) - iminodibenzyl.

24. 2-hydroxy-5-($\gamma$-ethylaminopropyl)-iminodibenzyl.

25. Crystalline 2-hydroxy-5-($\gamma$-dimethylaminopropyl)-iminodibenzyl having a melting point in the range from 132–135° C.

26. Crystalline 2 - hydroxy - 5-($\gamma$-methylaminopropyl) iminodibenzyl having a melting point of 160° C.

References Cited
UNITED STATES PATENTS

| | | | |
|---|---|---|---|
| 2,554,736 | 5/1951 | Haefliger et al. | 260—239 |
| 3,074,931 | 1/1963 | Craig | 260—239 |

FOREIGN PATENTS 215,335   6/1958   Australia.

ALEX MAZEL, *Primary Examiner.*

ALTON D. ROLLINS, *Assistant Examiner.*